United States Patent [19]

Kizawa et al.

[11] Patent Number: 5,385,031
[45] Date of Patent: Jan. 31, 1995

[54] AIR CONDITIONER WITH FAN SPEED CONTROLLED BY OSCILLATING LOUVER POSITION

[75] Inventors: Yoshihiro Kizawa; Toshimitsu Fukushima; Hiroyoshi Katsuyama; Isamu Makino; Toshiyuki Yamada, all of Kusatsu, Japan

[73] Assignee: Daikin Industries, Ltd., Osaka, Japan

[21] Appl. No.: 136,988

[22] Filed: Oct. 18, 1993

Related U.S. Application Data

[63] Continuation of Ser. No. 912,998, Jul. 14, 1992, abandoned.

[30] Foreign Application Priority Data

Jul. 17, 1991 [JP] Japan .................. 3-176532

[51] Int. Cl.⁶ .............................................. F25D 17/04
[52] U.S. Cl. ....................... 62/186; 62/179; 454/256; 454/313; 454/319; 236/49.3
[58] Field of Search ............ 62/186, 408, 179; 236/49.3; 165/16; 454/258, 256, 313, 319, 320; 388/804, 811, 819, 824, 907.5

[56] References Cited

U.S. PATENT DOCUMENTS

| 3,684,170 | 8/1972 | Roof. | |
| 4,676,146 | 6/1987 | Takahashi et al. | 454/258 |
| 4,738,116 | 4/1988 | Himeno et al. | 236/49.3 |

FOREIGN PATENT DOCUMENTS

| 54-104637 | 8/1979 | Japan | 454/256 |
| 60-091152 | 5/1985 | Japan. | |
| 60-175951 | 9/1985 | Japan. | |
| 2-171539 | 7/1990 | Japan. | |

Primary Examiner—John M. Sollecito

[57] ABSTRACT

A rotational speed of a fan is maintained at a preset one when an angle of a flap is at a maximum air-flow angle, increased by a specified value when the angle of the flap has been changed by a specified angle in the direction away from the position of the maximum air-flow angle, and decreased by a specified value when the angle of the flap has been changed by a specified angle in the direction toward the position of the maximum air-flow angle. It is possible to prevent any occurrence of condensation and air-flow pulsating noise without needing any complex control such as load response control and yet without requiring any complicate construction in the flap.

3 Claims, 3 Drawing Sheets his application is a continuation, of application Ser. No. 07/912,998 filed on Jul. 14, 1992, now abandoned.

AIR CONDITIONER WITH FAN SPEED CONTROLLED BY OSCILLATING LOUVER POSITION

T
BACKGROUND OF THE INVENTION

1. Field of the Invention

The present invention relates to an air conditioner adapted to control the rotational speed, i.e. the number of rotations per unit time of a fan depending on an angle of a flap provided to an air outlet.

2. Description of the Prior Art

Air conditioners conventionally available include one in which a horizontal or vertical flap is provided to an air outlet, the flap being controlled by a stepping motor to thereby change the direction of air blown out through the air outlet. This conventional type of air conditioner has been arranged so that a control of an angle of the flap and that of a fan are carried out independently of each other.

Of such conventional air conditioners, one adapted to control a constant rotational speed for the fan has the following problems. That is, the amount of air flow will increase or decrease depending on a change in blowing resistance due to a change in the angle of the flap. Vapor condensation may in turn occur on the flap or the like. Thus, a change in the shape of the flap and the like may be needed to prevent such an occurrence of condensation. Therefore, the number of design man-hours or mold cost increases. In another air conditioner of the conventional type in which rotational speed of a fan is changed depending on a load to thereby control the amount of air flow to a constant, there have been problems such as those described below. That is, since the number of rotations of the fan per unit time will normally vary owing to a change in blowing resistance due to a change in the angle of the flap, a pulsating noise occurs with the air flow. Many manhours are involved in tests for determining constants necessary for load response control or the number of printed circuit boards must be increased to accommodate circuit components to meet the constants.

SUMMARY OF THE INVENTION

The object of the present invention is therefore to provide an air conditioner capable of preventing vapor condensation and air-flow pulsating noise without the need of any complex control such as load response control and yet without any constructional change in the shape of a flap or the like.

In order to achieve the aforementioned object, the present invention provides an air conditioner in which air heat-exchanged by a heat exchanger is fed in an air outlet by a fan, and an angle of a flap provided to the air outlet is controlled by an angle control means to thereby change a direction of air blown out through the air outlet. This air conditioner comprises angle change calculation means for calculating a direction and amount of a change in the angle of the flap upon receiving a signal from the angle control means; and rotational speed control means for, upon receiving calculation result of the angle change calculation means, maintaining a rotational speed of the fan at a preset one when the angle of the flap is a maximum air-flow angle at which an amount of air blown out through the air outlet is at a maximum, increasing the rotational speed of the fan by a specified value when the angle of the flap has changed by a specified angle in a direction away from a position of the maximum air-flow angle, and decreasing the rotational speed of the fan by a specified value when the angle of the flap has changed by a specified angle in a direction toward the position of the maximum air-flow angle.

The angle change calculation means, upon receiving a signal from the angle control means for controlling the angle of the flap provided to the air outlet, calculates the direction and amount of change in the angle of the flap. Then the rotational speed control means, upon receiving the calculation result of the angle change calculation means, either maintains the rotational speed of the fan at a preset one when the angle of the flap is a maximum air-flow angle at which the amount of air blown out through the air outlet is a maximum, or increases the rotational speed of the fan by a specified value when the angle of the flap has changed by a specified angle in the direction away from the position of the maximum air-flow angle, or decreases the rotational speed of the fan by a specified value when the angle of the flap has changed by a specified angle in the direction toward the position of the maximum air-flow angle.

In this way the rotational speed of the fan is controlled depending on the angle of the flap, which allows the control to be simplified, while it is further possible to prevent the occurrence of condensation and air-flow pulsating noise by properly setting the control range of the rotational speed of the fan.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now the present invention is described in more detail with reference to the embodiment illustrated by the accompanying drawings.

Figure 1:
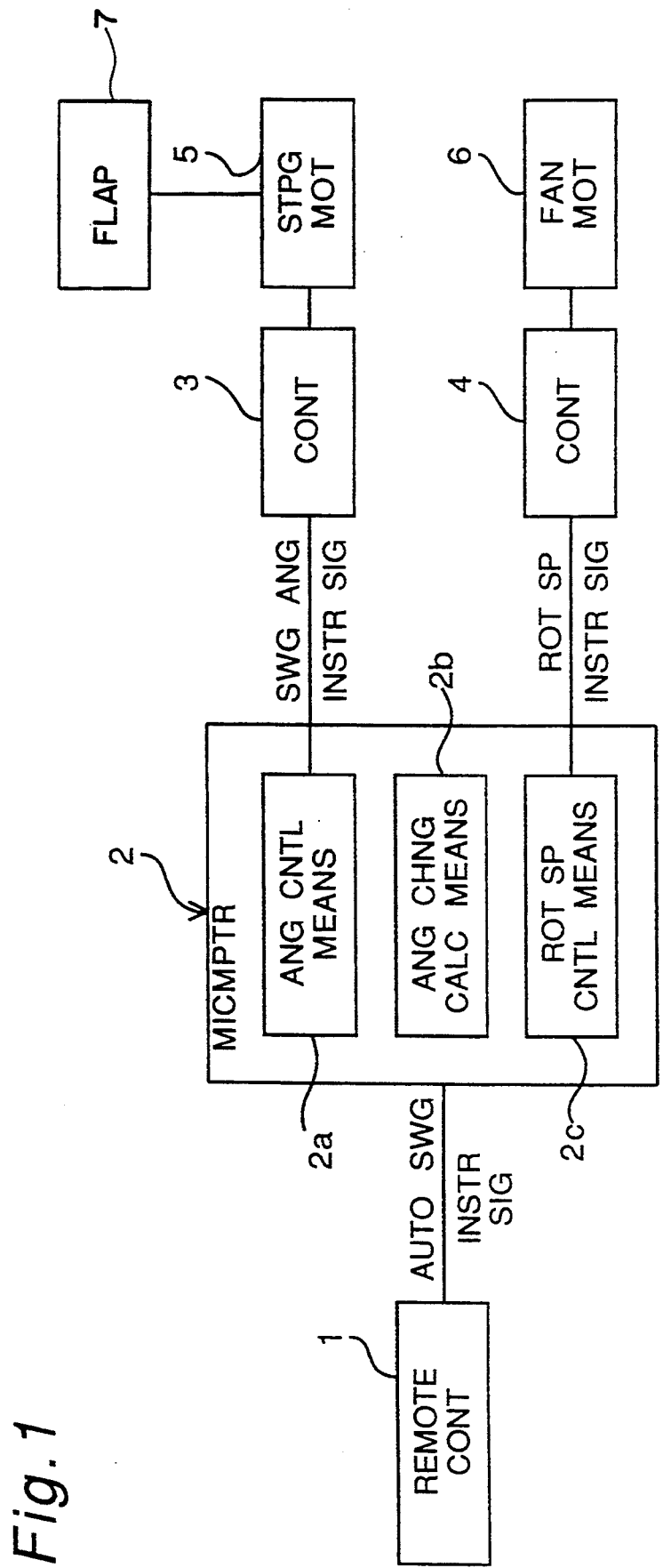
FIG. 1 is a schematic block diagram of a main part of an embodiment of an air conditioner of the present invention.
Figure 2:
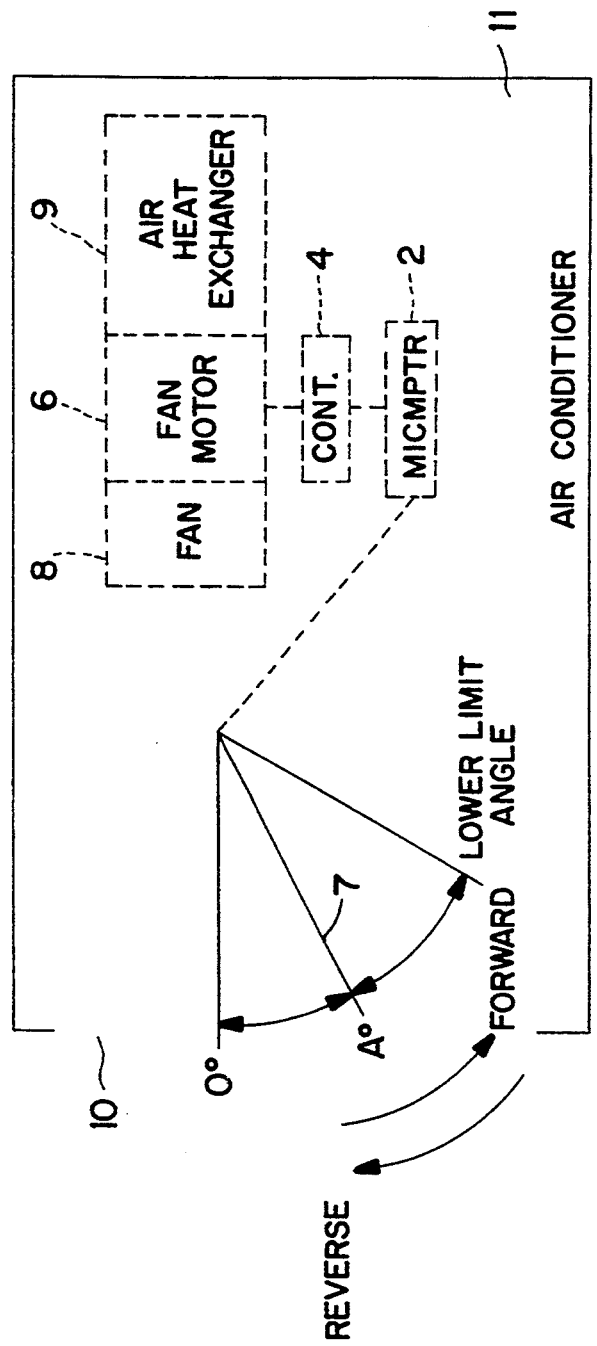
FIG. 2 is a view for explaining a variation of an angle of a flap from a maximum air-flow angle.

FIG. 1 is a block diagram of a main part of an embodiment of the present invention. A reference numeral 1 stands for a remote controller, 2 for a microcomputer, 3 and 4 for controllers, 5 for a stepping motor for driving a flap 7 (horizontal blade) provided to an air outlet 10, and 6 for a fan motor for feeding air heat-exchanged by a heat exchanger 9 in the air outlet 10 of air conditioner 11, the fan 8. The air outlet and the heat exchanger 9 are shown in FIG. 2 and are well-known.

The microcomputer 2 is provided with an angle control means 2a for controlling the rotational angle of the stepping motor 5 (i.e. the angle of the flap 7) via the controller 3, an angle change calculation means 2b for calculating the direction and amount of a change in the angle of the flap 7 upon receiving a signal from the angle control means 2a, and a rotational speed control means 2c for controlling the rotational speed of the fan motor 6 via the controller 4.

The rotational speed control means 2c makes the fan motor 6 rotate at a number of rotations per unit time set by the remote controller 1 or by air-flow automatic control via the controller 4. The angle control means 2a, on the other hand, makes the stepping motor 5 rotate via the controller 3 upon receiving an auto swing instruction from the remote controller 1, so that the flap swings, thereby changing the direction of air blown out through the air outlet. The flap, as shown in FIG. 2, swings between the angle of 0° and the lower limit angle, an air flow reaching its maximum at maximum air-flow angle (A°), which is the position of minimum static pressure.

When the flap is made to swing with the rotational speed of the fan motor 6 maintained at the above-noted set one, the amount of air flow will change depending on change in blowing resistance, which leads to occurrence of vapor condensation on the flap and other components. On this account, the angle change calculation means 2b calculates the change and its amount in the angle of the flap and then, based on the calculation result, the rotational speed control means 2c in turn makes the rotational speed of the fan motor 6 change depending on the angle (X°) of the flap (i.e. rotating position of the stepping motor 5) in a manner as described below, so that any condensation is prevented. Changing the rotational speed of the fan motor 6 will be effected as follows:

(i) If $0 \leq X < A$:
  (1) The rotational speed of the fan will be changed by $-\Delta W\alpha$ each time the flap has moved in the forward direction by $\Delta\alpha°$; and
  (2) The rotational speed of the fan will be changed by $+\Delta W\alpha$ each time the flap has moved in the reverse direction by $\Delta\alpha°$.
(ii) If $A < X \leq$ Lower limit:
  (1) The rotational speed of the fan will be changed by $+\Delta W\beta$ each time the flap has moved in the forward direction by $\Delta\beta°$; and
  (2) The rotational speed of the fan will be changed by $-\Delta W\beta$ each time the flap has moved in the reverse direction by $\Delta\beta°$.

Where, the rotational speed of the fan (W') is assumed to be the minimum at the set rotational speed (W). Thus the result will be:

$$w' = w + \Sigma\Delta W \ (\Delta W: \pm W\alpha, \pm \Delta W\beta)$$

$$W' \geq W$$

In addition, the range of change in the rotational speed of the fan is assumed to be one in which any variation in the air-flow noise can be suppressed, so that any air-flow pulsating noise will not occur.

Figure 3:
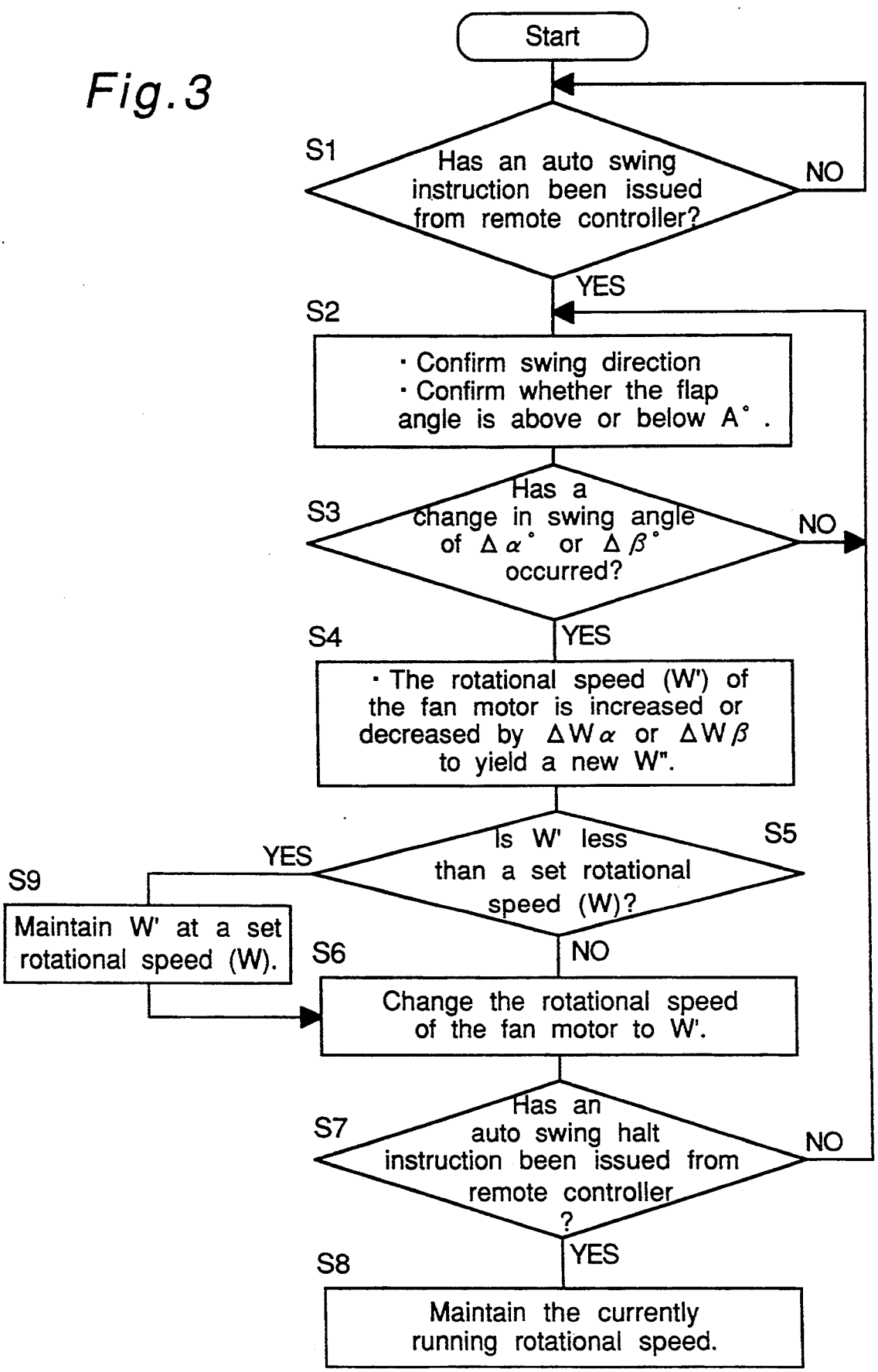
FIG. 3 is a flowchart showing a control of the same embodiment.

The controlling operation of the present embodiment is explained hereinbelow according to the flowchart in FIG. 3.

At step S1, the angle control means 2a decides whether or not an auto swing instruction has been issued from the remote controller 1. When it has, the angle control means 2a controls the stepping motor 5 via the controller 3 so that the flap automatically swings while it outputs a signal representing a swing angle to the angle change calculation means 2b. Based on the signal from the angle control means 2a, the angle change calculation means 2b calculates the direction and amount of change in the angle of the flap. Next, at step S2, the rotational speed control means 2c determines the swing direction of the flap, based on the calculation result of the angle change calculation means 2b while it determines whether the angle of the flap is above or below A°. Subsequently at Step S3, it is decided whether or not there has occurred a change of $\Delta\alpha°$ or $\Delta\beta°$ in the swing angle. Then if there has occurred such a change, the operation goes to step S4, where according to the procedures (i) and (ii) with the position of the flap and the change in the swing angle incorporated thereinto, the currently running rotational speed W' of the fan motor by $\Delta W\alpha$ or $\Delta W\beta$ is increased or decreased to yield a new W'. At step S5 it is decided whether or not this new W' is less than the set rotational speed (W). If W' > W, the operation goes to step S6 as it is, where the rotational speed of the fan motor 6 is changed to W'; if W' ≤ W, then the relation W' = W is accomplished at step S9 and thereafter step S6 succeeds, where the rotational speed of the fan motor 6 is changed to the very W'. At the following step S7, it is decided whether or not an auto swing halt instruction has been issued from the remote controller 1. If it has not, the operation returns to step S2, where the foregoing operation is repeated; if it has, the operation goes to step S8, where the rotational speed of the fan motor is maintained at the currently running rotational speed.

In this way the rotational speed of the fan is increased or decreased depending on the amount of change in the angle of the flap from the maximum air-flow angle, so that the amount of air blown out through the air outlet will not be changed to any large extent. Thus, it is possible to prevent any occurrence of condensation without changing the construction of the flap shape and the like. Also, it is possible to suppress any occurrence of air-blow pulsating noise by properly setting the control range of the rotational speed of the fan. Furthermore, the resulting content of the control is simpler than that of load response control, and thus the number of man-hours required for a test for determining constants can be reduced while the resulting circuitry can be simplified.

As apparent from the foregoing description, the air conditioner of the present invention comprises: angle change calculation means for, upon receiving a signal from angle control means for controlling an angle of a flap provided to an air outlet, calculating the direction and amount of a change in the angle of the flap; and rotational speed control means for, upon receiving the calculation result of the angle change calculation means, maintaining the rotational speed of the fan at a preset one when the angle of the flap is a maximum air-flow angle at which the amount of air blown out through the air outlet is at a maximum, increasing the rotational speed of the fan by a specified value when the angle of the flap has changed by a specified angle in the direction away from the position of the maximum air-flow angle, and decreasing the rotational speed of the fan by a specified value when the angle of the flap has changed by a specified angle in the direction toward the position of the maximum air-flow angle. Thus, it is possible to prevent any occurrence condensation and airflow pulsating noise, to reduce the number of manhours and the material cost owing to the fact that no complicate construction is required, and to allow the total cost to be reduced to a substantial extent by reducing the number of manhours for the test for determining the constants and by reducing circuit components owing to the fact that no complex control is required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air conditioner, having a stepping motor for driving a flap, a fan motor for feeding heat-exchanged air and angle control means for controlling an angle of the flap via the stepping motor, the air conditioner comprising:

angle change calculation means for calculating a direction and amount of a change in the angle of the flap upon receiving a signal from the angle control means; and rotational speed control means for, upon receiving calculation result of the angle change calculation means, maintaining a rotational speed of the fan at a preset one when the angle of the flap is a maximum air-flow angle at which an amount of the heat-exchanged air flowing around the flap is at a maximum, increasing the rotational speed of the fan by a specified value when the angle of the flap has changed by a specified angle in a direction away from a position of the maximum air-flow angle, and decreasing the rotational speed of the fan by a specified value when the angle of the flap has changed by a specified angle in a direction toward the position of the maximum air-flow angle, the rotational speed control means incrementally changing the rotational speed of the fan when the flap moves by at least the specified angle and maintaining the rotational speed of the fan when the flap moves less than the specified angle or the flap is stationary, the specified angle being greater than zero.

2. The air conditioner as recited in claim 1, wherein the flap is movable between a first position, through a second position to a third position, the second position being between the first and third positions, the angle control means controlling the stepping motor to move the flap, the rotational speed control means controlling the rotational speed of the fan based upon movement of the fan calculated by the angle change calculation means, the flap in the second position having a maximum air-flow angle and minimum static pressure.

3. The air conditioner as recited in claim 1, wherein:

when the flap moves to the first position or between the first position and second position, the rotational speed control means will change the rotational speed of the fan by $-\Delta W\alpha$ when the flap is moved toward the second position, and by $+\Delta W\alpha$ when the flap is moved away from the second position, and when the flap moves to the third position or between the second position and third position, the rotational speed control means will change the rotational speed of the fan by $+\Delta W\alpha$ when the flap moves away from the second position, and by $-\Delta W\alpha$ when the flap moves toward the second position, wherein $\alpha$ and $\beta$ are angles between the second position and the flap, $-\Delta W$ is a decrease in the rotational speed of the fan and $+\Delta W$ is an increase in the rotational speed of the fan and wherein the preset rotational speed of the fan (W) and a current rotational speed of the fan (W') satisfy the equation $$W' = W + \Sigma \Delta W \ (\Delta W: \pm W\alpha, \pm \Delta W\beta)$$

with the current rotational speed of the fan (W') being greater than or equal to the preset rotational speed of the fan (W'≧W).

* * * * *